United States Patent [19]

Sloo

[11] Patent Number: 5,668,953

[45] Date of Patent: Sep. 16, 1997

[54] METHOD AND APPARATUS FOR HANDLING A COMPLAINT

[76] Inventor: Marshall Allan Sloo, 4746 Roanoke Pkwy. - #702, Kansas City, Mo. 64112

[21] Appl. No.: 392,053

[22] Filed: Feb. 22, 1995

[51] Int. Cl.⁶ ............................ G06F 17/60; G06F 19/00
[52] U.S. Cl. ................................................. 705/1; 395/226
[58] Field of Search ................................. 395/201, 207; 364/401, 402

[56] References Cited

PUBLICATIONS

Unknown author, Better Business Bureau Web Site, http://www.bbb.org. Mar. 23, 1997.
Unknown Author, National Consumer Complaint Center Web Site, http://seamless.com/nccc/cb–intro.html. Mar. 23, 1997.

Primary Examiner—Gail O. Hayes
Assistant Examiner—Steven R. Yount
Attorney, Agent, or Firm—Hovey, Williams, Timmons & Collins

[57] ABSTRACT

A method and apparatus for handling a complaint and associated response in a computer by way of a telecommunications network is provided. The complaint handling method includes the steps of receiving a complaint, notifying the subject of the complaint, receiving a response to the complaint from the subject, and storing the complaint and associated response on a publicly accessible computer bulletin board.

37 Claims, 4 Drawing Sheets

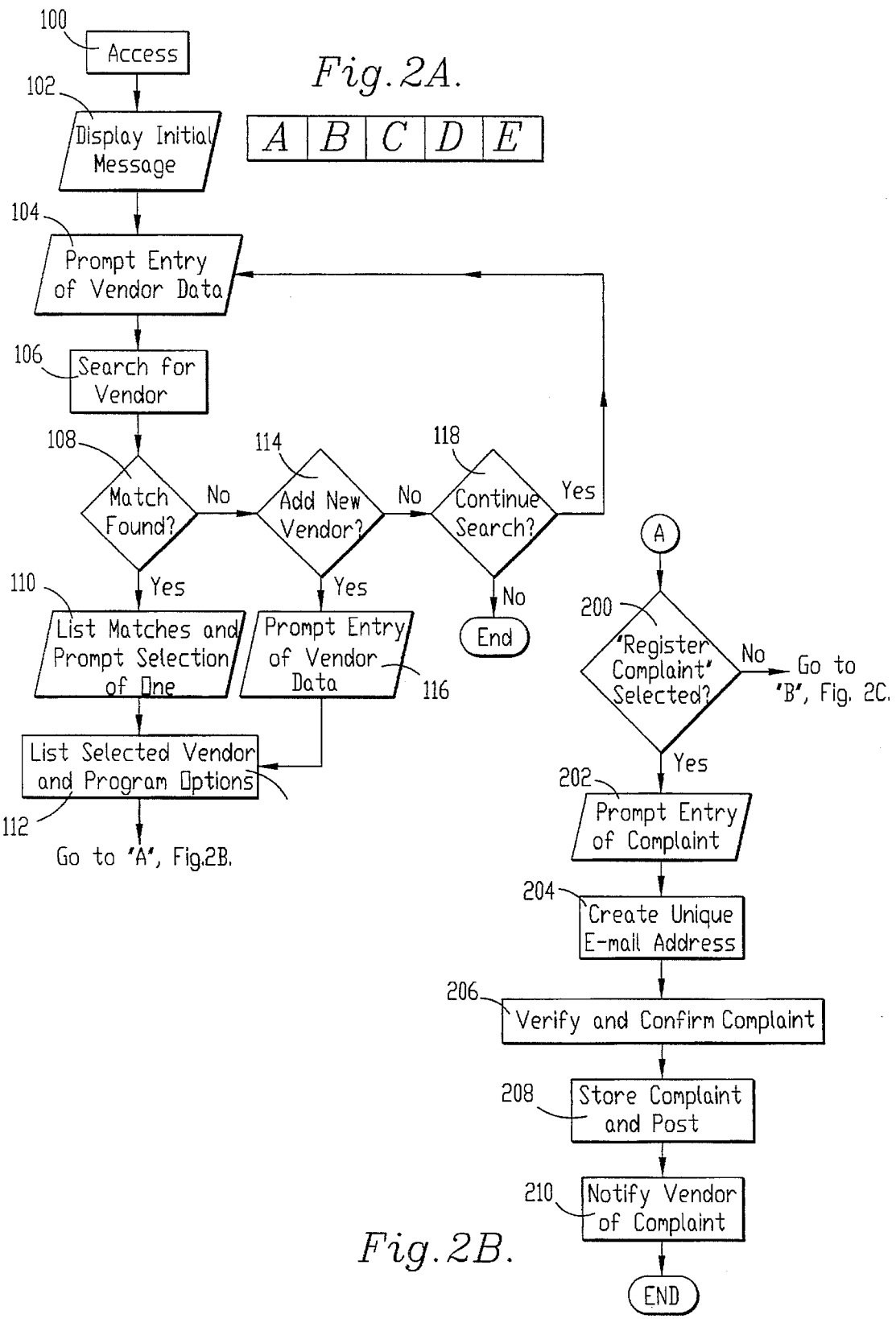

Complaint: CCCID5185

Past Complaint(s) ID: CCCID5185
--> This consumer has registered a complaint against this company/org. before.

Complaint Key Words: Registered -- 5/15/94
Apartment Advisor, information, wrong, damage, resulted Full Complaint:
Wrong information listed in utilities section of the Apartment Advisor and the company wouldn't reimburse me for costs incurred when I subscribed to cable instead of electric service.

Desired Resolution:
Pay me for the installation charges issued to me by the cable company Response by subject: Received -- 5/15/94
As a simple oversight, we assumed the number for the electric company was the same as the previous year. But they changed it on us. My apologies go out to you and anyone affected by the incorrect information. We cannot be responsible for your cable installation bill, however.

Fig. 3.

METHOD AND APPARATUS FOR HANDLING A COMPLAINT

BACKGROUND OF THE INVENTION

1. Field of the Invention

The present invention relates to a method and apparatus for handling, processing and resolving a complaint using a computer accessed by way of a telecommunications network, and more particularly to a method and apparatus for receiving a complaint from a complainant concerning a subject, notifying the subject of the receipt of the complaint, receiving a response from the subject, and storing the complaint and associated response as a record in a publicly accessible and searchable computer bulletin board.

2. Description of the Prior Art

When consumers receive unsatisfactory goods or services, they often wish to issue a complaint to the vendors. Typically, consumers have issued complaints directly to the vendors by filling out a complaint form or by directly speaking to the vendor. Although this method of issuing complaints sometimes resolves the particular dispute at issue, it does not provide a means for informing other consumers about the complaint. Additionally, some consumers do not like to issue face-to-face complaints due to inconvenience or embarrassment.

Government and other non-profit consumer organizations have provided means for informing consumers about the products and services of a vendor. When a consumer issues a complaint to one of these organizations, it is incorporated with other complaints concerning the vendor into a file or report on the vendor. If other consumers wish to check the reputation of the vendor, they may request a report from the consumer complaint organization detailing the complaints issued against the vendor.

Although consumer complaint organizations have improved the handling of complaints, they also suffer from several limitations. For example, consumer complaint organizations don't provide a forum for resolving personal disputes because the vendor is never notified directly each time a complaint has been lodged against it. Consumer complaint organizations also do not provide a means for the vendor to publicly respond to the complaint. Although most complaints are legitimate, some are not, and a vendor's reputation can be needlessly harmed by unanswered, unfounded complaints.

Additionally, consumer complaint organizations are typically local or regional organizations without ties to one another. Accordingly, the methods used for resolving complaints vary among the organizations, resulting in inconsistent handling of consumer complaints.

In view of the foregoing, there is a need for an improved method for handling a complaint which overcomes the limitations of the prior art. More particularly, there is a need for a method of handling a complaint that allows consumers to lodge complaints, informs the vendor of the receipt of the complaint, allows the vendor to respond to the complaint, provides public access to the complaint and associated response, provides a private forum for the resolution of each complaint, and encourages resolution of the complaint by exposing the complaint to the public.

SUMMARY OF THE INVENTION

The present invention overcomes the problems outlined above and provides an improved method and apparatus for handling, processing, and resolving a complaint. More particularly, the present invention provides a method and apparatus for handling a complaint that allows consumers to lodge complaints, informs the vendor of the receipt of the complaint, allows the vendor to respond to the complaint, provides public access to the complaint and the associated response, and provides a forum for the resolution of each complaint.

The preferred complaint handling method is implemented on a complaint handling apparatus including a central computer, a plurality of access terminals, and a communications network coupling the central computer with any number of access terminals. The central computer is preferably a microcomputer operable for performing all the steps in the complaint handling method including receiving a complaint, notifying the subject of the complaint of the receipt of the complaint, receiving a response from the subject of the complaint, posting the complaint and associated response in a publicly accessible and searchable computer bulletin board, and encouraging the resolution of the complaint.

The central computer includes memory means for storing the complaint and response and retrieving means for retrieving the complaint and response. The access terminals are networked with the central computer by way of the communications network and are operable for allowing users to transmit complaints and responses to the central computer and view previously stored complaints and responses. Complaints and responses can also be faxed to the central computer and entered by way of an optical character scanning device.

The method of the present invention is preferably implemented in the form of a computer program for operating the central computer of the complaint handling apparatus. The method broadly includes the steps of receiving into the complaint handling apparatus a complaint from a complainant concerning a product provided by a vendor, storing the complaint in a directory categorized by a characteristic relating to the product or the vendor, receiving into the complaint handling apparatus a response to the complaint from the vendor of the product and storing the response in association with the complaint, and allowing persons other than the vendor and the complainant access to the complaint handling apparatus to retrieve and review the complaint and associated response.

The method may further include the step of notifying the vendor of the receipt of the complaint in the central computer so that the vendor can deliver into the central computer a response to the complaint. A private message area or forum may also be provided to allow the vendor and the complainant to negotiate a settlement to the dispute. The private message area may be unique e-mail address known only by the complainant and the vendor or may be a directory requiring a password known only by the two parties in the central computer dedicated for private messages between the complainant and the vendor. Once the dispute has been resolved to the complainant's satisfaction, he or she may remove the complaint from the public access memory portion of the central computer.

The above described method and apparatus for handling a complaint offers numerous advantages. For example, the method provides a means for solving individual disputes between a consumer and a vendor while allowing other consumers to view the complaint and the associated response. This allows consumers to check the reputation of the vendor and the record of the manner in which the vendor has previously dealt with complaints before dealing with the vendor. The method encourages consumers to register their complaints since they can remain anonymous.

Additionally, the method provides a means for informing a vendor that a complaint has been lodged against it. This allows a vendor to publicly respond to the complaint so that consumers have access to both the complaint and the response.

The method also provides a process for mediating a dispute in a private message area that allows the complainant and the vendor to enter and retrieve messages for resolving the dispute. Since the complaint is stored in a publicly accessible and searchable computer bulletin board, and since only the complainant can remove the complaint from the bulletin board, the vendor is encouraged to respond to the complaint and negotiate a settlement.

Additionally, the method establishes a standardized method for resolving complaints consistently regardless of the goods, services or vendor and creates an automated system for holding vendors accountable for their behavior and practices with regards to consumers.

BRIEF DESCRIPTION OF THE DRAWING FIGURES

A preferred embodiment of the present invention is described in detail below with reference to the attached drawing figures, wherein:

FIG. 2A is a computer program flow chart illustrating the preferred method for operating the apparatus of the present invention;

FIG. 2B is a continuation of FIG. 2A illustrating the complaint registration portion of the method;

FIG. 3 is a sample screen displayed by the apparatus and method of the present invention.

DETAILED DESCRIPTION OF THE PREFERRED EMBODIMENTS

Figures 1, 2E:
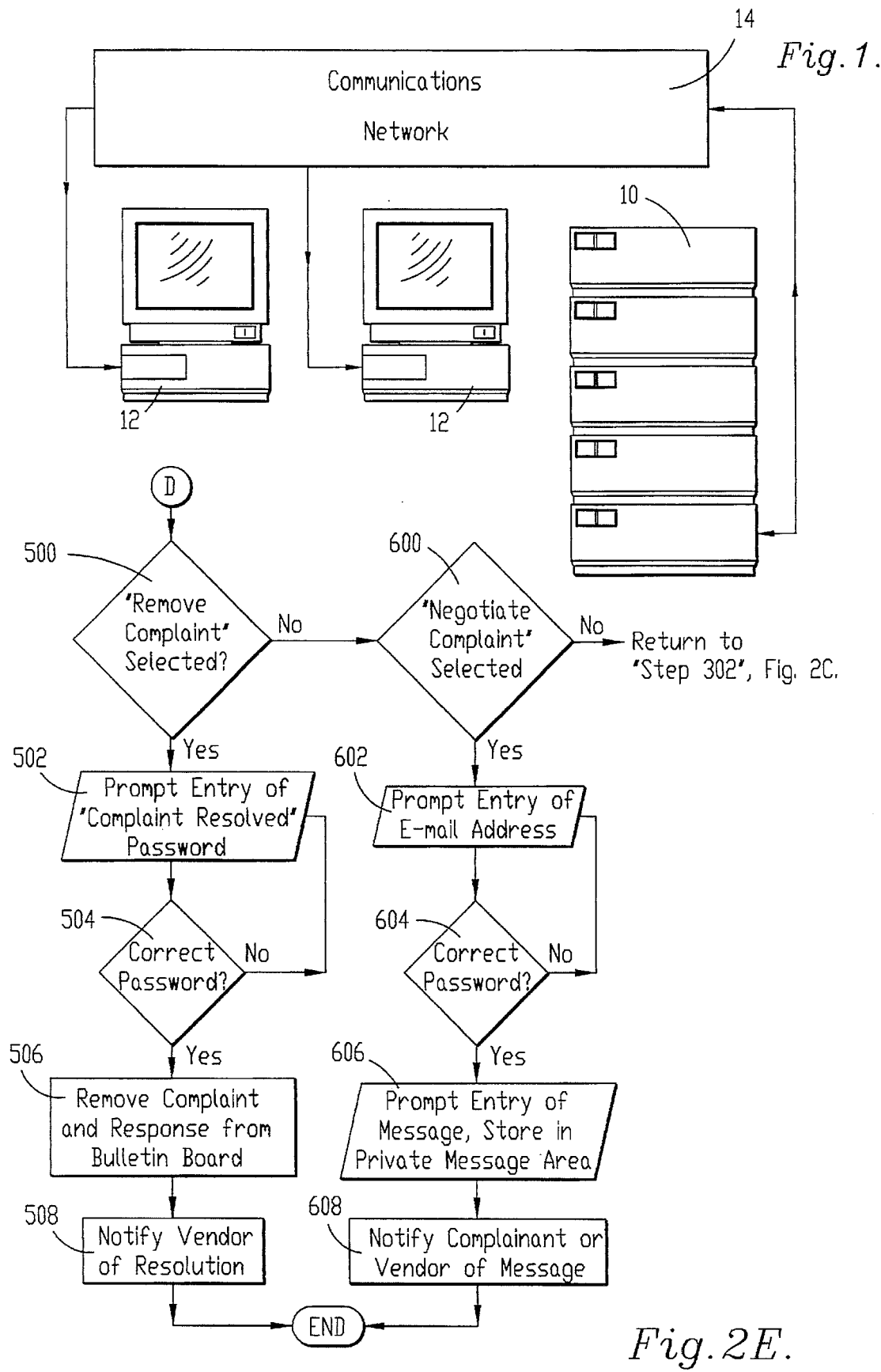
FIG. 1 is a schematic representation of a complaint handling apparatus constructed in accordance with the preferred embodiment of the present invention shown coupled with a plurality of access terminals by a telecommunications network.
FIG. 2E is a continuation of FIG. 2A illustrating the complaint removal and negotiation portions of the method.

Turning now to the drawings, FIG. 1 illustrates preferred complaint handling apparatus 10 for implementing the complaint handling method of the present invention. Complaint handling apparatus 10 is preferably coupled with a plurality of access terminals 12 by communications network 14.

In more detail, complaint handling apparatus 10 is preferably a file-server microcomputer such as those manufactured by Digital Equipment Corporation. Complaint handling apparatus 10 includes conventional memory, input and output ports, and a modem, and is operable for receiving, storing and retrieving a complaint and a response thereto.

Access terminals 12 are provided for users to enter complaints and responses for delivery to complaint handling apparatus 10 and for receiving transmissions from complaint handling apparatus 10. Access terminals 12 preferably include conventional memory, input and output ports, and a modem, and are operable for receiving and transmitting complaints to complaint handling apparatus 10. Access terminals 12 are preferably personal computers such as IBM compatible microcomputers containing 486 type microprocessors; however, they may be "dumb" terminals with communication capabilities. Access terminals 12 include software for interpreting the software and complaint handling apparatus 10. Those skilled in the art will appreciate that any number of access terminals 12 may be coupled with complaint handling apparatus 10.

Communications network 14 couples complaint handling apparatus 10 with access terminals 12 and provides a path for communication therebetween. Network 14 is preferably a conventional telecommunications network including a plurality of switches connected to respective local exchange carriers. Network 14 may also be a local area network, wide area network, wireless network, voice network, or any other type of network operable for coupling access terminals 12 to complaint handling apparatus 10.

Those skilled in the art will appreciate that the complaint handling method of the present invention is applicable to virtually all types of hardware and preferred complaint handling apparatus 10, access terminals 12 and communications network 14 as described herein are merely illustrative of the preferred embodiment of the invention.

The complaint handling method of the present invention is implemented in the form of a computer program for operating complaint handling apparatus 10. The computer program is preferably stored in the read-only-memory (ROM) of complaint handling apparatus 10, but may also be stored in the hard drive memory of apparatus 10 or on conventional external disks for transfer to the memory of complaint handling apparatus 10. The complaints, messages and responses delivered to complaint handling apparatus 10 are preferably stored in the hard drive memory of apparatus 10.

The method of the present invention handles user complaints, messages and responses. The complaint or message may concern products including goods, classes of goods, services, and/or the vendor, individual, or organization providing the products. The subject of the complaint may be a person, manufacturer, distributor, wholesaler, retailer or any person or entity responsible for providing or selling the products. As used herein, the term product is understood to include goods, classes of goods, services, and/or the vendor, individual, or organization providing the products.

The computer program is preferably written in a Standard Generalized Mark-up Language (SGML) such as Hypertext language. This mark-up language cooperates with a standard server language such as Common Gateway Interface (CGI) or Practical Extraction and Report Language (PERL) for handling the various operating functions of the complaint handling apparatus 10. Those skilled in the art will appreciate that the computer program but can be written in other computer languages as a matter of design choice. The steps of the computer program illustrated herein are merely illustrative of the preferred embodiment of the invention and can be modified or adapted.

Referring to the flow chart of FIG. 2A, the preferred computer program enters at step 100 where a user operating one of the access terminals 12 accesses complaint handling apparatus 10 by way of telecommunications network 14. Access may include conventional log-on or connection for data transfer procedures. In step 102, the program displays or transmits an initial message to access terminals 12 describing the function and capabilities of the computer program.

The program next moves to step 104 which prompts the user to enter data needed to search for a particular vendor, product or service located in the memory of complaint handling apparatus 10. For example, step 104 may prompt the user to enter the name and address of the vendor and the types of goods and services that the vendor provides. Step 104 may also prompt entry of product brand names or even classes of products to facilitate searching for a vendor, manufacturer, distributor or retailer if exact name and address information is not known.

Step 106 uses the information gathered in step 104 to search the memory of complaint handling apparatus 10 for vendors matching the search data. As described in more detail below, characterizing data for a plurality of vendors, manufacturers, distributors, retailers and wholesalers is stored in the memory of complaint handling apparatus 10 for use in finding the subject of a complaint and for browsing previously entered complaints and responses. Products may also be categorized in the memory of complaint handling apparatus 10 by a harmonized standard number system sponsored by the United Nations.

After searching the complaint database, the program enters step 108 which asks whether a vendor matching the search data is located in the complaint database. If the answer is yes, the program moves to step 110 where the vendors matching the search data are displayed and/or transmitted to access terminals 12. If more than one vendor matches the search data, step 110 prompts the user to select the desired vendor. In step 112, the vendor selected by the user is listed with a list of program options. In the preferred embodiment, the options include "Register a Complaint" and "Browse Complaint Records".

If the answer to step 108 is no, the program moves to step 114 which asks whether the user wishes to add a new vendor to the complaint database. If the answer to step 114 is yes, step 116 prompts the user to enter vendor data similar to the data entered in step 104, but also including additional information necessary to add a new vendor record to the complaint database. The program then loops back to step 112 to display the program options.

If the answer to step 114 is no, the program moves to step 118, which asks whether the user wishes to continue the search. If the answer to step 118 is yes, the program loops back to step 104 which prompts the user to enter new vendor search data. If the answer to step 118 is no, the program ends, and the user is disconnected from complaint handling apparatus 10, or the program returns to the main menu of options.

FIG. 2B illustrates the complaint registration step of the complaint handling method of the present invention. If the "Register a Complaint" option is selected at step 200, the program proceeds to steps 202–210 to register a user complaint concerning a vendor. If the "Register a Complaint" option is not selected, the program continues at FIG. 2C as described below.

Step 202 of FIG. 2B prompts the user to enter his or her complaint. The preferred program prompts the entry of a detailed description of the complaint, the action requested to resolve the dispute or desired resolution, an abbreviated description of the complaint such as several key words summarizing the complaint, the complainant's phone number and e-mail address, and a personal "complaint resolved" password.

As described in more detail below, the detailed description is delivered to the vendor but is not initially posted for public view. The action requested by the complainant to resolve the dispute is used as a basis for the private negotiation of the complaint between the complainant and the vendor. The key words are used to summarize the complaint in a publicly accessible and searchable computer bulletin board. The complainant's phone number and e-mail address are used to verify and confirm complaint and complainant information submitted during registration. The e-mail address must be correct in order for the complainant to receive the necessary correspondence generated by the complaint handling method and apparatus. The phone number must be correct because it is the complainant ID that is revealed to the subject of the complaint. Finally, the "complaint resolved" password is later used by the complainant to indicate to the complaint handling apparatus 10 that his or her complaint has been resolved so that the complaint can be removed from the computer bulletin board.

After receiving the complaint, the program moves to step 204 where it creates a unique e-mail address for the complaint registered in step 202. The e-mail address is given only to the complainant and the vendor and can be used as a private message area or as a password for entry into the private forum for the resolution of the complaint. With the private message area, the complainant can privately negotiate with the vendor without meeting the vendor face-to-face.

Step 206 begins the verification and confirmation of the complaint registered in step 202. In the preferred embodiment, the program transmits the complaint to the e-mail address provided by the complainant during registration. The complainant is then instructed to e-mail a confirmation which may include any corrections back to complaint handling apparatus 10. Step 206 compares the information in the confirmation to the information received in step 202 to verify that the e-mail address is valid and may also verify the accuracy of the complaint. A blank e-mail message may also be transmitted to the complaint handling apparatus to confirm that the complaint is to be registered.

The program may also require the payment of a complaint registration fee before posting the complaint. The fee can be collected by various methods including a 900 number charge back line or by credit card processing while on-line.

Once the complaint registration is confirmed in step 206, the program moves to step 208 where the complaint is stored in the memory of complaint handling apparatus 10. Those skilled in the art will appreciate that the complaint can be stored in a complaint database or in a unique directory created for the complaint and the associated response from the vendor. The directory may be categorized by a characteristic relating to the vendor and/or the vendor's product.

The key words or abbreviated description of the complaint are stored in a publicly accessible and searchable complaint record such as a computer bulletin board. As described in more detail below, this allows users other than the vendor and complainant to access complaint handling apparatus 10 and browse complaints and associated responses.

The final step in the complaint registration portion of the program is performed in step 210 where the program notifies the vendor of the receipt of the complaint. Notification occurs by e-mail or conventional postal service mail and preferably includes the contents of the complaint, the complainant's desired resolution, the complainant's phone number, the e-mail address created for private negotiations with the complainant, and instructions on how to contact complaint handling apparatus 10 to publicly respond to the complaint. As described below, this notification gives the vendor an opportunity to publicly respond to the complaint and to negotiate the complaint and/or resolution with the complainant.

Figure 2C:
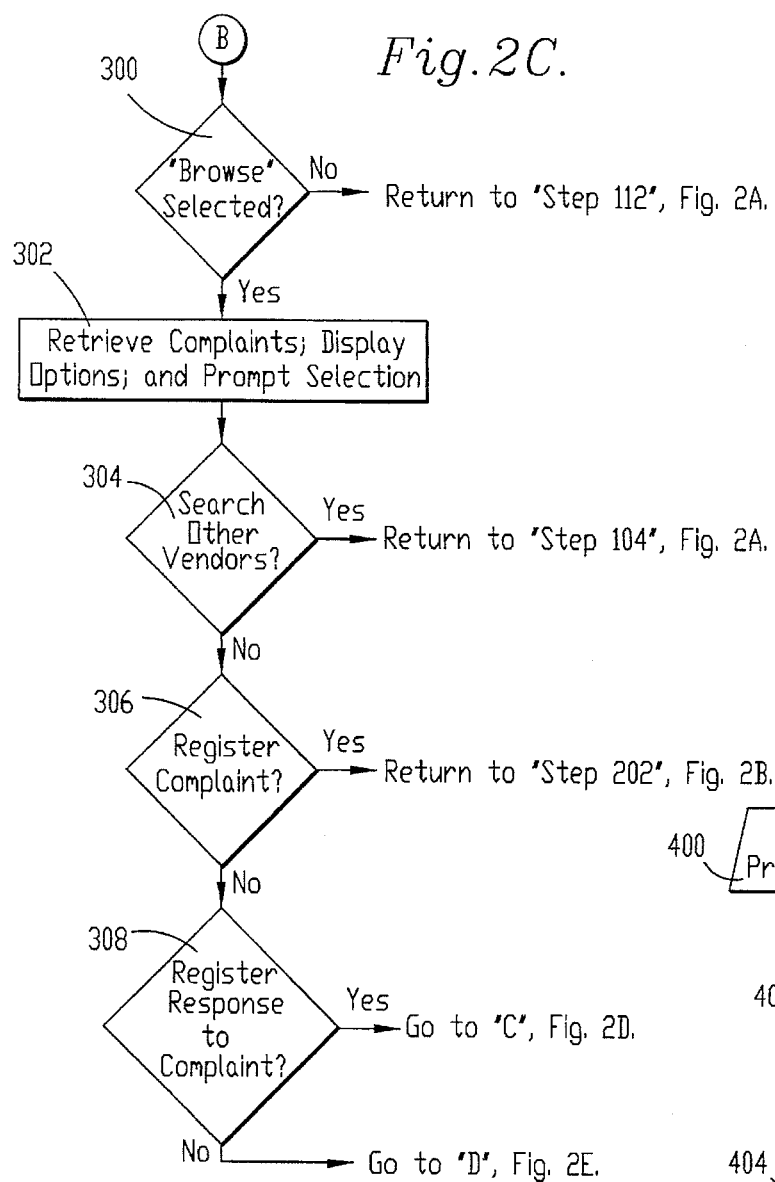
FIG. 2C is a continuation of FIG. 2A illustrating the complaint browsing portion of the method.

If the "Register a Complaint" option is not selected in step 200 of FIG. 2B, the program continues at FIG. 2C. FIG. 2C illustrates the complaint search or browse portion of the program. The browse portion of the program enters at step 300 which asks whether "Browse" was selected. If the answer is yes, the program proceeds to steps 302–308 to allow the user to browse complaints and associated responses as described below. If the "Browse" option was not selected, the program returns to step 112 of FIG. 2A to list the program options.

At step 302 of FIG. 2C, the program retrieves from the memory of complaint handling apparatus 10 all complaints and associated responses recorded concerning the vendor selected in steps 110 and 112 of FIG. 2A. FIG. 3 illustrates a sample screen displaying complaints and associated responses. The program also lists several options for further program steps in Step 302 and prompts the user to select one of the options. The preferred program provides the following options: "Search other Vendors", "Register a Complaint", "Register a Response to an Existing Complaint", "Remove a Resolved Complaint", and "Negotiate a Complaint".

Step 304 asks whether the "Search other Vendors" option was selected in step 302. If yes, the program returns to step 104 of FIG. 2A to search for another vendor. If the answer is no, the program continues to step 306 which asks whether the "Register a Complaint" option was selected. If yes, the program returns to step 202 of FIG. 2B to begin the complaint registration process.

If the answer to step 306 is no, the program continues to step 308 which asks whether the "Register a Response to an Existing Complaint" option was selected in step 302. If yes, the program advances to FIG. 2D which provides The response registration steps of the program. If the answer to step 308 is no, the program advances to FIG. 2E which provides the complaint negotiation steps of the program.

Figure 2D:
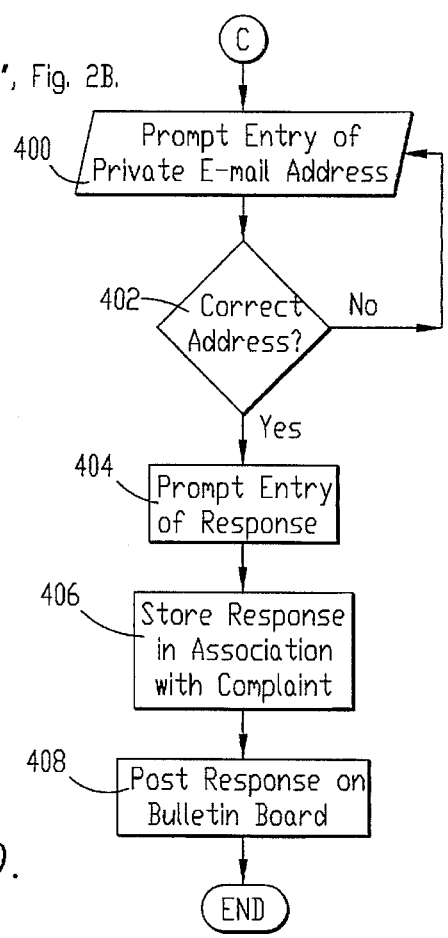
FIG. 2D is a continuation of FIG. 2A illustrating the response registration portion of the method.

Referring to FIG. 2D, the response registration portion of the program enters at step 400 which prompts the user to enter the private e-mail address created in Step 204 of the complaint registration portion of the program. As discussed above, only the complainant and the subject of the complaint are provided with this e-mail address. This assures that only the vendor that is the subject of the complaint can enter a response to the complaint.

Step 402 asks whether the correct e-mail address was entered in step 400. If the answer is no, the program returns to step 400 to re-prompt the user to enter the e-mail address. The program may limit this loop to a predetermined number of attempts before disconnecting the user from the program. If the answer to step 402 is yes, the program advances to step 404 which prompts the vendor to enter a response to the complaint. Step 406 then stores the response in association with the complaint in the memory of the complaint handling apparatus 10. Step 408 then stores either the entire response or portions of the response in the memory dedicated to the public access bulletin board in association with the key words of the respective complaint.

The subject of the complaint may also mail or fax its response to a complaint via conventional postal service mail or facsimile service. In this case, the response is optically scanned, optical character recognized, and transferred to the memory of complaint handling apparatus 10. Alternatively, the subject may provide an oral response to the complain that is entered into the complaint handling apparatus by a voice recognition device.

FIG. 2E illustrates the complaint negotiation portion of the program. Step 500 asks whether the "Remove Complaint" option was selected in step 302 of FIG. 2C. If the answer is yes, the program advances to step 502 which prompts the user to enter the "Complaint Resolved" password. As discussed above, the "complaint resolved" password is created by the complainant during complaint registration and is not disclosed to others. This assures that only the complainant can remove a complaint from the memory of complaint handling apparatus 10 dedicated for the public access bulletin board.

Step 504 asks whether the entered password matches the "Complaint Resolved" password. If no, the program returns to step 502 to reprompt the user to enter the "Complaint Resolved" password. The program may limit this loop to a predetermined number of attempts before disconnecting the user from the program. In the preferred embodiment, step 504 prompts the complainant for his or her complaint resolved password by e-mail. The program sends an e-mail message to the e-mail address registered with the complaint. This prompts the complainant to send the complaint resolve password back to the complaint handling apparatus by e-mail.

If the answer to step 504 is yes, the program continues to step 506 which removes the complaint and the associated response from the complaint handling apparatus memory dedicated to the bulletin board. The program then continues to step 508 which notifies the vendor that the complaint has been resolved to the complainant's satisfaction. This notification is preferably sent by e-mail to one of the access terminals 12, but may also be sent by conventional postal service mail.

If the answer to step 500 is no, the program advances to step 600, which asks whether the "Negotiate Complaint" option was selected. If the answer is yes, step 602 prompts the user to enter the unique e-mail address created in step 204 of FIG. 2B. As discussed above, this e-mail address is given only to the complainant and the vendor that is the subject of the complaint. This assures that only the complainant and the vendor can enter into this portion of the program.

Step 604 asks whether the entered e-mail address is correct. If no, the program returns to step 602 to reprompt the user to enter the e-mail address. The program may limit this loop to a predetermined number of attempts before disconnecting the user from the program.

If the e-mail address is correctly entered, step 606 prompts the user to enter the private message and stores the message in a private message area such as the e-mail address. Step 608 then notifies the complainant or the vendor of the receipt of the message so that the complaint or vendor can read and respond to the message. If the answer to step 600 is no, the program returns to step 302 of FIG. 2C to list the program options.

Although the invention has been described with reference to the preferred embodiment illustrated in the attached drawing figures, it is noted that equivalents may be employed and substitutions made herein without departing from the scope of the invention as recited in the claims. For example, although many of the steps of the present method have been described in terms of on-line transactions, some of the steps may actually occur "off-line" via e-mail, voice, or other data transmission processing means. Additionally, the complaint handling method of the present invention is applicable to operating virtually all types of memory storage devices, and the preferred complaint handling apparatus device, telecommunications networks, and individual access terminals as described above may be replaced with any types of computers and communication networks. Additionally, the complaint handling method may be implemented in a computer system within a single corporation with a plurality of directly coupled computers or access terminals without a telecommunications network.

Having thus described the preferred embodiment of the invention, what is claimed as new and desired to be protected by Letters Patent includes the following:

I claim:

1. A method of handling user complaints concerning products provided by a plurality of different vendors comprising the steps of:

providing complaint handling computer means operable for receiving one of said complaints and a response thereto, said complaint handling computer means including memory means for storing said complaint and response and retrieving means for retrieving said complaint and response;

receiving into said complaint handling computer means said complaint concerning a product provided by a vendor and storing said complaint in a directory categorized by a characteristic relating to said product;

notifying the vendor of the receipt of said complaint in said complaint handling computer means;

receiving into said complaint handling computer means said response to said complaint from the vendor of said product and storing said response in said directory in association with said complaint;

creating a private message area in said complaint handling computer means which can only be accessed by the complainant and the vendor; and receiving into said private message area negotiations between the complainant and the vendor regarding said complaint for the resolution of said complaint.

2. The method as recited in claim 1, further including the step of allowing persons other than the vendor and the complainant access to said complaint handling computer means to retrieve and review said complaint and associated response.

3. The method as recited in claim 1, wherein said directory is categorized by the name of the vendor.

4. The method as recited in claim 1, wherein said directory is categorized by the type of product of the vendor.

5. The method as recited in claim 1, wherein said directory is categorized by a specific product of the vendor.

6. The method as recited in claim 1, wherein said complaint handling computer means includes a microcomputer operable for receiving a complaint and a response thereto.

7. The method as recited in claim 1, wherein said complaint and said response are delivered to said complaint handling computer means via a telecommunications network.

8. The method as set forth in claim 1, further including the steps of receiving a request from the complainant to remove said complaint and said response from said publicly searchable database, and removing said complaint and said response from said publicly searchable database in response to said request.

9. The method as set forth in claim 8, said request including a password, said method further including the step of verifying the accuracy of said password before removing said complaint and said response from said publicly searchable database.

10. An apparatus for handling user complaints concerning products provided by a plurality of different vendors, said apparatus comprising:

complaint handling computer means operable for receiving one of said complaints and a response thereto, said complaint handling computer means including memory means for storing said complaint and said response and retrieving means for retrieving said complaint and said response; and access means for allowing a complainant to access said complaint handling computer means and enter said complaint concerning a product provided by a vendor, wherein said complaint is stored in said complaint handling computer means in a directory categorized by a characteristic relating to said product, said complaint handling computer means including notifying means for notifying the vendor of the receipt of said complaint in said complaint handling computer means, said complaint handling computer means including a private message area which can only be accessed by the complainant and the vendor for receipt of negotiations between the complainant and the vendor regarding said complaint for the resolution of said complaint, said complaint handling computer means further including a publicly searchable database for receipt of selected portions of said complaint and said response, said access means including means for allowing persons other than the vendor and the complainant to access said publicly searchable database to retrieve and review said selected portions of said complaint and associated response.

11. The apparatus as set forth in claim 10, wherein said directory is categorized by the name of the vendor.

12. The apparatus as set forth in claim 10, wherein said directory is categorized by the type of product of the vendor.

13. The apparatus as set forth in claim 10, wherein said directory is categorized by a specific product of the vendor.

14. The apparatus as set forth in claim 10, wherein said complaint handling computer means includes a computer operable for receiving a complaint and a response thereto.

15. The apparatus as set forth in claim 10, wherein said access means includes an access terminal coupled with said complaint handling computer operable for receiving and delivering complaints and responses to said complaint handling computer.

16. The apparatus as set forth in claim 15, wherein said access terminal is coupled with said complaint handling computer via a telecommunications network.

17. The apparatus as set forth in claim 16, wherein said complaint is delivered to said complaint handling computer via said telecommunications network.

18. The method as recited in claim 10, wherein said product includes one of the group consisting of goods, classes of goods, services, a vendor, and an individual.

19. A method of handling user complaints concerning products provided by a plurality of different vendors comprising the steps of:

providing complaint handling computer means operable for receiving one of said complaints and a response thereto, said complaint handling computer means including memory means for storing said complaint and said response and retrieving means for retrieving said complaint and said response;

receiving into said complaint handling computer means said complaint from a complainant concerning a product provided by the vendor and storing said complaint in a directory categorized by a characteristic relating to one of said vendor and product;

receiving into said complaint handling computer means said response to said complaint from the vendor of said product and storing said response in said directory in association with said complaint;

creating a private message area in said complaint handling computer means which can only be accessed by the complainant and the vendor;

receiving into said private message area negotiations between the complainant and the vendor regarding said complaint for the resolution of said complaint;

creating a publicly searchable database in said complaint handling computer means;

receiving into said publicly searchable database selected portions of said complaint and said response; and allowing persons other than the vendor and the complainant to access said pubicly searchable database to retrieve and review said selected portions of said complaint and associated response.

20. The method as recited in claim 19, further including the step of notifying the vendor of the receipt of said complaint in said complaint handling computer means for prompting delivery into said complaint handling computer means said response to said complaint.

21. The method as recited in claim 20, wherein said complaint handling computer means includes a microcomputer operable for receiving a complaint and a response thereto.

22. The method as recited in claim 21, further including the step of providing an access terminal coupled with said complaint handling computer, said access terminal being operable for delivering complaints and responses to said complaint handling computer and for receiving previously stored messages and complaints from said complaint handling computer.

23. The method as recited in claim 22, wherein said access terminal is a personal computer operable for receiving and delivering complaints and responses to said complaint handling computer.

24. The method as recited in claim 23, wherein said access terminal is coupled with said complaint handling computer via a telecommunications network.

25. The method as recited in claim 24, wherein said complaint is delivered to said complaint handling computer via said telecommunications network.

26. The method as recited in claim 24, wherein said complaint handling computer notifies the vendor of the receipt of said complaint via said telecommunications network.

27. The method as recited in claim 19, wherein said directory is categorized by the name of the vendor.

28. The method as recited in claim 19, wherein said directory is categorized by the type of product of the vendor.

29. The method as recited in claim 19, wherein said directory is categorized by a specific product of the vendor.

30. The method as recited in claim 19, wherein said complaint handling computer means provides a private message area for the resolution of said complaint.

31. The method as recited in claim 19, wherein said complaint receiving step includes the step of charging a fee for the storing of said complaint in said complaint handling computer means.

32. The method as recited in claim 31, wherein said fee charging step includes debiting a charge card account.

33. The method as recited in claim 31, wherein said fee charging step includes debiting a fee-charge phone line.

34. The method as recited in claim 19, further including the steps:

charging a fee for the storing of said complaint in said complaint handling computer means;

notifying the vendor of the receipt of said complaint in said complaint handling computer means for prompting delivery into said complaint handling computer means said response to said complaint;

providing an access terminal for delivering said complaints and responses to said complaint handling computer means and for receiving previously stored messages and complaints from said complaint handling computer means; and providing communication between said access terminal and said complaint handling computer means by way of a telecommunications network.

35. The method as recited in claim 19, wherein said product includes one of the group consisting of goods, classes of goods, services, vendors, organizations, and individuals.

36. The method as set forth in claim 19, further including the steps of receiving a request from the complainant to remove said complaint and said response from said publicly searchable database, and removing said complaint and said response from said publicly searchable database in response to said request.

37. The method as set forth in claim 36, said request including a password, said method further including the step of verifying the accuracy of said password before removing said complaint and said response from said publicly searchable database.

* * * * *